(12) United States Patent
Kepplinger et al.

(10) Patent No.: US 6,264,722 B1
(45) Date of Patent: Jul. 24, 2001

(54) PROCESS FOR PRODUCING LIQUID PIG IRON OR INTERMEDIATE STEEL PRODUCTS AND INSTALLATION FOR IMPLEMENTING IT

(75) Inventors: Werner Leopold Kepplinger, Leonding; Felix Wallner; Johannes Schenk, both of Linz, all of (AT)

(73) Assignees: Voest-Alpine, Linz (AT); Pohang Iron & Steel Co. Ltd., Kyung Sang Book-do (KR)

( * ) Notice: Subject to any disclaimer, the term of this patent is extended or adjusted under 35 U.S.C. 154(b) by 0 days.

(21) Appl. No.: 08/983,529
(22) PCT Filed: Jul. 18, 1996
(86) PCT No.: PCT/AT96/00130
§ 371 Date: Jan. 20, 1998
§ 102(e) Date: Jan. 20, 1998
(87) PCT Pub. No.: WO97/04138
PCT Pub. Date: Feb. 6, 1997

(30) Foreign Application Priority Data

Jul. 19, 1995 (AT) .................................................. 1236/95

(51) Int. Cl.$^7$ .................................................. C21B 13/14
(52) U.S. Cl. .............................. 75/445; 75/492; 266/144; 266/142; 266/156; 266/212
(58) Field of Search ..................... 75/445, 10.11, 75/10.42, 10.6, 443, 492

(56) References Cited

U.S. PATENT DOCUMENTS

| | | | |
|---|---|---|---|
| 3,002,736 | 10/1961 | Travis | 263/52 |
| 3,607,224 | 9/1971 | Blaskowski | 75/26 |
| 4,685,964 | * 8/1987 | Summers et al. | 75/492 |
| 4,699,655 | * 10/1987 | Milionis | 75/492 |
| 5,082,251 | 1/1992 | Whipp | 266/142 |
| 5,127,346 | * 7/1992 | Kepplinger et al. | 110/264 |
| 5,567,379 | * 10/1996 | Kepplinger et al. | 266/143 |
| 5,584,910 | * 12/1996 | Kepplinger et al. | 75/445 |
| 5,647,888 | * 7/1997 | Keogh et al. | 75/443 |
| 5,948,139 | * 9/1999 | Kepplinger et al. | 75/443 |

FOREIGN PATENT DOCUMENTS

| | | |
|---|---|---|
| 1154817 | 9/1963 | (DE) . |
| 1267692 | 5/1968 | (DE) . |

(List continued on next page.)

OTHER PUBLICATIONS

The American Hertage Dictionary of the English Language, Third Edition. 1992.*

Primary Examiner—Roy King
Assistant Examiner—Tima McGuthry-Banks
(74) Attorney, Agent, or Firm—Ostrolenk, Faber, Gerb & Soffen, LLP

(57) ABSTRACT

In a process for producing molten pig iron or steel preproducts from fine-particulate iron containing material in a meltdown gasifying zone of a melter gasifier, under the supply of carbon-containing material and oxygen-containing gas at the simultaneous formation of a reducing gas in a bed formed of solid carbon carriers, the iron-containing material is melted when passing the bed. In order to be able to work with a charge consisting of fine ore by up to 100%, yet reliably avoid discharging of the fine ore supplied, a supply duct for fine-particulate coal, such as coal dust and/or other carbon-containing materials including volatile portions, and a duct feeding an oxygen-containing gas enter in the vicinity of the reducing-gas discharge duct of the melter gasifier, the fine-particulate coal and/or other carbon-containing materials including volatile portions are reacted to fine-particulate coke upon introduction into the melter gasifier, the fine-particulate coke is discharged along with the reducing gas carried off the melter gasifier and is separated in a separating means.

32 Claims, 2 Drawing Sheets

FOREIGN PATENT DOCUMENTS

| | | |
|---|---|---|
| 2660884 | 4/1985 | (DE) . |
| 3504346 | 8/1986 | (DE) . |
| 0010627 | 5/1980 | (EP) . |
| 0111176 | 6/1984 | (EP) . |
| 0183677 | 6/1986 | (EP) . |
| 0217331 | 4/1987 | (EP) . |
| 0481955 | 4/1992 | (EP) . |
| 0576414 | 12/1993 | (EP) . |
| 1257877 | 2/1961 | (FR) . |

* cited by examiner

PROCESS FOR PRODUCING LIQUID PIG IRON OR INTERMEDIATE STEEL PRODUCTS AND INSTALLATION FOR IMPLEMENTING IT

The invention relates to a process for producing molten pig iron or steel preproducts from fine-particulate iron-containing material, in particular reduced sponge iron, in a meltdown gasifying zone of a melter gasifier, in which, under the supply of carbon-containing material and oxygen-containing gas at the simultaneous formation of a reducing gas in a bed formed of solid carbon carriers, the iron-containing material is melted when passing the bed, optionally upon previous complete reduction, as well as a plant for carrying out the process. From EP-B -0 010 627 a process for producing molten pig iron or steel preproducts from particulate iron-containing material, in particular prereduced sponge iron, as well as for producing reducing gas in a melter gasifier is known, in which a fluidized bed is formed of coke particles by adding coal and by blowing in an oxygen-containing gas. The oxygen-containing gas, or pure oxygen, is injected in the lower region of the melter gasifier. The particulate iron-containing material, in particular prereduced sponge iron, and the lumpy coal are top-charged through charging openings provided in the hood of the melter gasifier, the falling particles are braked in the fluidized bed and the iron-containing particles are reduced and melted while falling through the coke fluidized bed. The melted metal covered by slag collects on the bottom of the melter gasifier. Metal and slag are drawn off through separate tap openings.

However, a process of this type is not suitable for processing fine-particle sponge iron and fine-particulate coal, since fine-particle solids particles would be immediately discharged from the melter gasifier due to the violent gas flow prevailing there. Discharging is even more favored by the temperature prevailing in the upper region of the melter gasifier, since this is too low to ensure melting of the sponge iron on the site of charging.

From U.S. Pat. No. 5,082,251 it is known to directly reduce iron-containing fine ore by fluidization by aid of a reducing gas produced from natural gas. The iron-rich fine ore is reduced by aid of a reducing gas under elevated pressure in a system comprised of fluidized bed reactors arranged in series. After this, the thus produced sponge iron powder is subjected to hot or cold briquetting. Separate melting aggregates are to be provided for further processing the sponge iron powder. The treatment of fine-particulate coal is not possible there.

From EP-B -0 111 176 is it known to produce sponge iron particles and molten pig iron from lumpy iron ore, the iron ore being directly reduced in a direct-reduction aggregate and sponge iron particles discharged from the direct-reduction aggregate being separated into a coarse-grain fraction and a fine-grain fraction. The fine grain fraction is supplied to a melter gasifier, in which the heat required for melting the sponge iron as well as the reducing gas fed to the direct-reduction aggregate are produced from the coal charged and from the oxygen-containing gas fed. In doing so, coal charging is possible, yet in lumpy form only; fine-particulate coal would be carried off the melter gasifier along with the reducing gas.

In a process according to EP-A-0 576 414 lumpy iron ore-containing charging substances are directly reduced in a reduction shaft furnace by means of the reducing gas formed in the meltdown gasifying zone. The sponge iron thus obtained is then supplied to the meltdown gasifying zone. In order to be able to additionally utilize, in that known method, fine ore and/or ore dust, such as oxidic iron fine dust incurring in a metallurgical plant, the fine ore and/or the ore dust together with coke dust is supplied to a dust burner operating into the meltdown gasifying zone and is reacted in a sub-stoichiometric combustion reaction. Such a process allows for the efficient working up of fine ore and/or ore dust incurring in a metallurgical plant up to an amount of between 20 and 30% of the overall charge and, thus, the combined processing of lumpy ore and fine ore and also the processing of coke dust. The use of coal dust would, however, be problematic, because degasification and tar formation and hence caking within the conveying tube would be caused by the hot reduced ore.

The invention aims at avoiding these drawbacks and difficulties and has as its object to provide a process of the initially defined kind as well as a plant for carrying out the process, which enable the processing of fine-particulate coal and fine-particulate iron-containing material. On the one hand, discharging of the fine particles supplied, by the reducing gas produced in the melter gasifier is to be reliably prevented and, on the other hand, possibly required complete reduction of the iron-containing material is to be ensured. In particular, the invention has as its object to provide a process by which a charge comprised of fine-particulate iron-containing material by 100% can be processed to pig iron and/or steel prematerial when charging fine-particulate coal by using a melter gasifier.

In accordance with the invention, this object with a process of the initially defined kind is achieved in that a supply duct for fine-particulate coal, such as coal dust and/or other carbon-containing materials including volatile portions, and a duct feeding an oxygen-containing gas enter in the vicinity of the reducing-gas discharge duct of the melter gasifier, the fine-particulate coal and/or other carbon-containing materials including volatile portions are reacted to fine-particulate coke upon introduction into the melter gasifier, the fine-particulate coke is discharged along with the reducing gas carried off the melter gasifier and is separated in a separating means. According to the invention, the fine-particulate coal is converted into coke in a simple manner, utilizing the discharging effect caused by the violent reducing gas flow. This fine-particle coke is substantially more readily handleable for further use, since degasification and tar formation need not be feared any longer. Other carbon-containing materials including a portion of volatile matter may, for instance, comprise synthetic shredder or fine-particle petroleum coke.

Preferably, the fine-particulate coke is supplied to the melter gasifier along with the fine-particulate iron-containing material optionally preheated and/or reduced by aid of the reducing gas, wherein, according to a preferred embodiment, in a killing zone formed above the bed a high-temperature combustion and/or gasification zone is formed under direct oxygen feeding by burning and/or gasifying the fine-particulate coke supplied to the melter gasifier, into which high-temperature combustion and/or gasification zone the fine-particulate iron-containing material is directly introduced, wherein at least surface melting of the iron-containing material and agglomerating of the same are effected by the heat released during the reaction of the fine-particulate coke.

The thus formed agglomerates have a higher rate of vertical descent on account of their increased mass. Thereby and by their enhanced form factor, i.e., by their more favorable $C_w$ value due to extensive sphere formation, the iron-containing material is prevented from being discharged by the reducing gas carried off the melter gasifier.

From EP-A-0 217 331 it is known to directly prereduce fine ore by fluidization and to conduct the prereduced fine ore into a melter gasifier and completely reduce and melt the same by means of a plasma burner under the supply of a carbon-containing reductant. A fluidized bed and above the same a fluidized bed of coke form within the melter gasifier. The prereduced fine ore or sponge iron powder, respectively, is supplied to a plasma burner provided in the lower section of the melter gasifier. There, it is disadvantageous that, due to the supply of prereduced fine ore directly in the lower melting region, i.e., in the region where the melt collects, complete reduction is no longer guaranteed and the chemical composition required for the further processing of the pig iron cannot be reached in any event. In addition, the introduction of large amounts of prereduced fine ore is not possible because of the fluidized bed and fixed bed, respectively, forming of coal in the lower region of the melter gasifier, since it is not possible to discharge the melting products from the high-temperature zone of the plasma burner to a sufficient extent. The introduction of elevated amounts of prereduced fine ore would immediately result in thermal and mechanical failures of the plasma burner.

In order to obtain mixing and working up of the supplied solids in a manner as uniform and complete as possible, the high-temperature combustion and/or gasification zone according to the invention advantageously is formed centrally and on the upper end of the melter gasifier and the supply of the materials is directed downwards, agglomeration suitably being accelerated and intensified by swirling the iron-containing material in the high-temperature combustion and/or gasification zone and, moreover, oxygen feeding into the high-temperature combustion and/or gasification zone likewise advantageously being effected under swirling.

According to a preferred variant of operation, the iron-containing material is introduced into the high-temperature combustion and/or gasification zone in a state mixed with the fine-particulate coke.

In addition, it is advantageous if the speed of entry of the iron-containing material into the high-temperature combustion and/or gasification zone is increased by aid of a propellant, such as nitrogen or in-process gas.

According to a preferred embodiment, reducing gas formed in the meltdown gasifying zone is fed to a preheating zone and/or a direct-reduction zone for pretreating the iron-containing material, the preheated and/or reduced iron-containing material being supplied to the high-temperature combustion and/or gasification zone in the hot state. Advantageously, fine-particulate coke may additionally be supplied to the preheating and/or direct reduction zone.

Advantageously, lumpy coal is additionally introduced into the meltdown gasifying zone for the formation of the bed comprised of solid carbon carriers.

A preferred variant is characterized in that the iron-containing material in the preheating and/or direct reduction zone is separated into a fine-grain fraction and a coarse-grain fraction, the latter preferably comprising particles of between 0.5 and 8 mm, and only the fine-grain fraction is introduced into the high-temperature combustion and/or gasification zone and the coarse-grain fraction is introduced directly into the melter gasifier, preferably into its killing space. The coarser portions of the reduced iron ore can be charged by gravity alone, if admixed into the high-temperature combustion and/or gasification zone they merely would consume heat. This heat, as a result, is available to the fine particles for agglomeration. Thus, the burner that serves for the formation of the high-temperature combustion and/or gasification zone can operate more efficiently and optionally may be dimensioned smaller without affecting agglomeration.

A further preferred variant is characterized in that the reducing gas is fed to the preheating zone and/or direct reduction zone in a non-purified state. Thereby, carbon-containing dust can be separated from the melter gasifier in the preheating and/or direct reduction zone.

A plant for carrying out the process comprising a melter gasifier including supply and discharge ducts for the addition of carbon-containing material, iron-containing material, for drawing off the reducing gas produced and for feeding an oxygen-containing gas as well as, furthermore, a slag and melt tap, a lower section of the melter gasifier being provided for collecting the molten pig iron and/or steel prematerial and the liquid slag, a central section located thereabove being provided for accommodating a bed of solid carbon carriers, and finally an upper section being provided as a killing space, is characterized in that the melter gasifier in the vicinity of the opening of the reducing-gas discharge duct comprises a burner for supplying fine-particulate coal, and that a separating means for separating fine-particulate coke discharged along with the reducing gas is provided in the reducing-gas discharge duct, a return duct for fine-particulate coke suitably running from the separating means into the melter gasifier.

Preferably, a burner supplying an oxygen-containing gas and fine-particulate iron-containing material and a supply means for supplying fine-particulate coke are provided on the upper end of the killing space.

Preferably, a single burner arranged centrally, i.e., on the vertical longitudinal central axis of the melter gasifier is provided, whose burner mouth is oriented towards the surface of the bed.

Suitably, the supply of fine-particulate coke likewise is effected via the burner, the latter advantageously being configured as an oxygen-carbon burner.

In order to obtain thorough mixing of the solids supplied to the burner both with one another and with the oxygen-containing gas fed, the burner advantageously is provided with a swirling means for the solids supplied via the burner as well as suitably with an additional swirling means for the oxygen-containing gas fed via the burner.

A simple burner configuration is feasible if a mixed-material duct for supplying the fine-particulate iron-containing material and the fine-particulate coke runs into the burner.

According to a further preferred embodiment, a reducing-gas discharge duct runs into a means for preheating and/or directly reducing the fine-particulate iron-containing material, departing from the killing space of the melter gasifier.

Preferably, the means for preheating and/or direct reduction comprises a fractionating means for separating the iron-containing material into a coarse-grain fraction and a fine-grain fraction and the fine-grain fraction is conducted to the burner via a duct, whereas the coarse-grain fraction is directly supplied to the melter gasifier via a duct.

Suitably, the reducing-gas discharge duct runs directly into the means for preheating and/or direct reduction, i.e., without intermediate arrangement of a dust separating means.

BRIEF DESCRIPTION OF THE DRAWINGS

In the appended drawings, FIGS. 1 and 2 each diagrammatically illustrates an embodiment of the invention.

DESCRIPTION OF THE PREFERRED EMBODIMENTS

Figure 1:
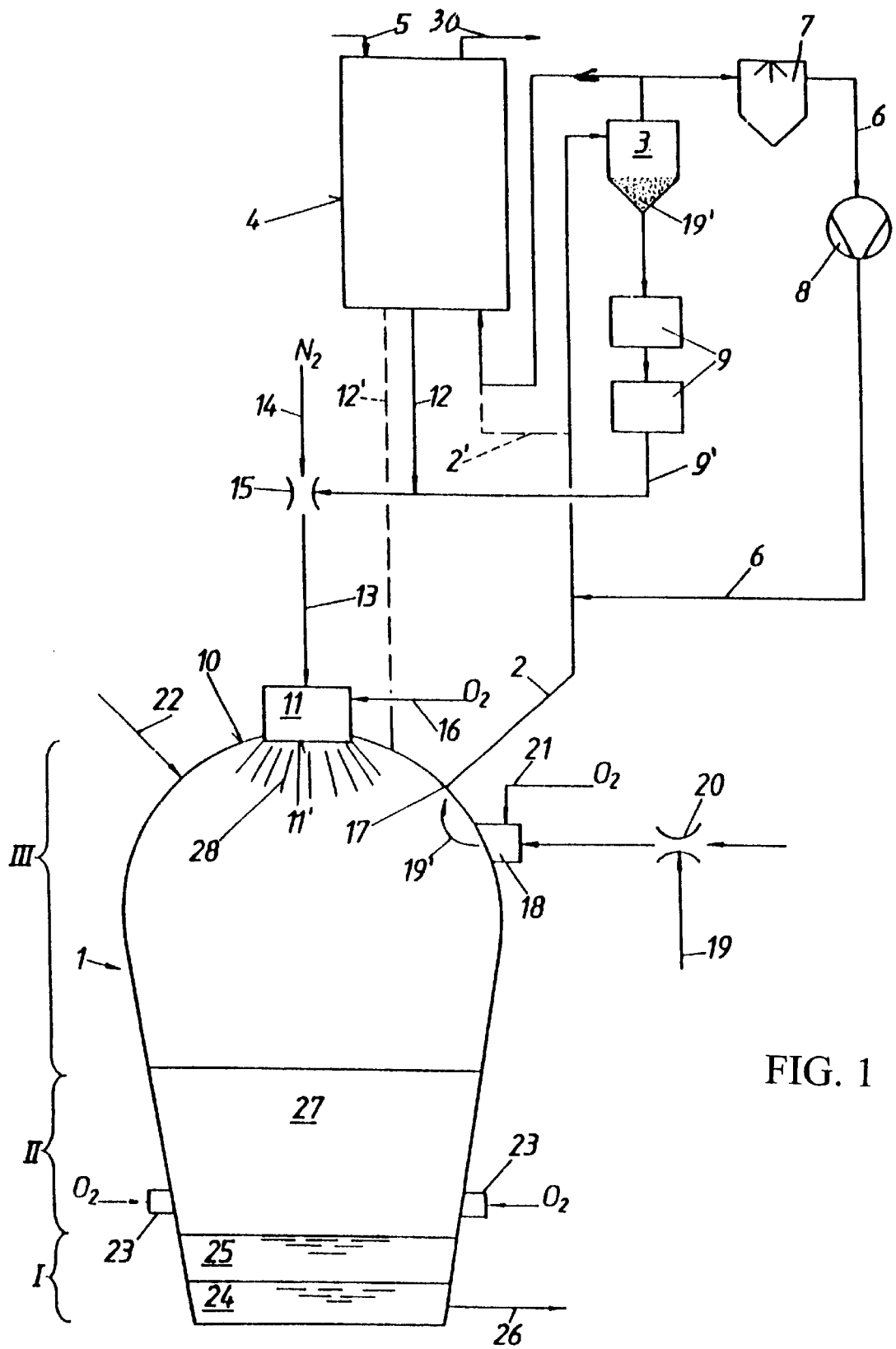

By 1 a melter gasifier is denoted, in which a CO and $H_2$-containing reducing gas is produced from coal and an oxygen-containing gas. This reducing gas is conducted off the melter gasifier 1 via a reducing-gas discharge duct 2 running into a gas purification cyclone 3 and from the cyclone 3 is fed to a reactor 4 for preheating and/or reducing fine-particle iron-containing material 5, such as, e.g., iron-containing dusts, in particular ore dusts, sponge iron dusts, etc. A portion of the reducing gas conducted away through the reducing-gas discharge duct 2, by means of a return duct 6 via a scrubber 7 and a compressor 8, is again recirculated into the reducing-gas discharge duct 2 in order to cool the reducing gas to the temperature required for its use within the reactor 4. Reactor 4 is provided with a gas discharge outlet 30. Reactor 4 is provided with a gas discharge outlet 30.

The reactor 4 advantageously is designed as a shaft furnace. The shaft furnace also could be replaced with a drum-type furnace or a rotating furnace. Furthermore, several fluidized-bed reactors consecutively arranged in series could be provided instead of the single reactor 4, the fine ore being conducted from one fluidized bed reactor to another through conveying ducts in a manner similar to that described in U.S. Pat. No. 5,082,251.

The fine particles separated in the cyclone 3, which are substantially comprised of coke particles or coke dust—as will be explained later on, via collecting containers 9 are supplied by means of a return duct 9' to a burner 11 centrally arranged on the upper end, i.e., top 10 or hood, of the melter gasifier 1, by means of which burner the fine-particulate iron-containing material 5 supplied from the reactor 4 through duct 12 is introduced into the melter gasifier 1. Prior to being introduced into the melter gasifier 1, the coke dust is mixed with the fine-particulate iron-containing material 5 and supplied to the burner 11 through a mixed-material duct 13, a propellant duct 14 running into the mixed-material duct 13 via an injector 15 to increase the entry speed of the solids supplied to the burner 11. Nitrogen, for instance, is used as a propellant. Furthermore, a duct 16 feeding an oxygen-containing gas runs into the burner 11.

The burner mouth 11' may be designed, for instance, as described in EP-A -0 481 955 with the mixed-material duct 13 running into a central internal tube of the burner 11, which is surrounded by an annular gap feeding said oxygen-containing gas. In principle, the coke might also be conveyed to the burner mouth 11' via separate lances. Advantageously, the solids supplied to the burner 11 are twisted by means of the burner 11 by twisting means (e.g., helically designed outlet channels) when leaving the burner 11. In addition, twisting of the oxygen jet fed via an annular space may be effected, thus ensuring particularly good mixing.

The fine-particulate coke or coke dust discharged from the melter gasifier 1 along with the reducing gas is formed in the following manner:

A burner 18 for supplying fine-particulate coal 19 and/or other carbon-containing materials having volatile portions opens in the vicinity of i.e., near the opening 17, or of several openings 17, of the reducing-gas discharge duct 2 of the melter gasifier 1. These may comprise, for instance, synthetic shredder waste or fine-particle petroleum coke. They are supplied to the burner 18 by aid of a propellant, such as nitrogen, which is fed via an injector 20. Furthermore, a duct 21 feeding an oxygen-containing gas runs into the burner 18.

A reaction—a partial combustion—of the supplied fine coal 19 to fine-particulate coke or coke dust 19' takes place, the latter being discharged almost completely along with the reducing gas due to the burner 18 being arranged in the vicinity of the opening 17 of the reducing-gas discharge duct 2, and separated in the cyclone 3.

On its upper end 10, the melter gasifier 1 comprises a supply duct 22 for lumpy carbon carriers, such as coal, as well supply ducts 23 arranged farther below for oxygen-containing gases as well as optionally supply ducts for carbon carriers liquid or gaseous at room temperature, such as hydrocarbons, as well as for burnt fluxes.

Molten pig iron 24 and/or molten steel prematerial and molten slag 25 collect in the melter gasifier 1 in a lower section I and are tapped via a tap 26.

In a section II arranged above the lower section I, of the melter gasifier 1, a fixed bed and/or a fluidized bed 27 forms of the solid carbon carriers charged. The supply ducts 23 for oxygen-containing gases open into this section II. An upper section III provided above the central section II functions as a killing space for the reducing gas forming in the melter gasifier 1 as well as for solids particles entrained with the gas flow. In the upper section III, there is the opening 17 of the reducing-gas discharge duct 2 and enters the burner 18 supplying the fine-particulate coal 19.

A high-temperature combustion and/or gasification zone 28 is formed at the burner mouth 11' of the burner 11, in which the fine particles of the iron-containing material 5 are melted completely or at least surfacially under the formation of droplets, thus causing the iron-containing fine-particles to agglomerate. Thereby, the fine-particulate iron-containing material 5 is effectively prevented from being discharged along with the reducing gas conducted away from the melter gasifier 1.

The droplet agglomerates forming have greater hydraulic diameters and/or higher densities and hence higher descending speeds than the fine particles. This descending speed is even further improved by the enhanced form factor, i.e. $C_w$ value, of the droplet agglomerates forming.

The arrangement of the burner 11 in a central region on top 10 of the melter gasifier 1 allows for uniform mixing of the solids particles supplied and hence complete agglomeration. As a result, the iron carriers are uniformly integrated in the fixed and/or fluidized bed 27 formed in the melter gasifier of solid carbon carriers. Thus, it is feasible to realize the melt-reduction process with 100% fine ore and to avoid discharging of the iron carriers from the melter gasifier 1 in the solid state.

The grain size of the fine-particulate coal intended to be used with the process according to the invention preferably ranges between 1 and 0 cm and that of the fine-particulate iron-containing material between 8 and 0 cm.

Figure 2:
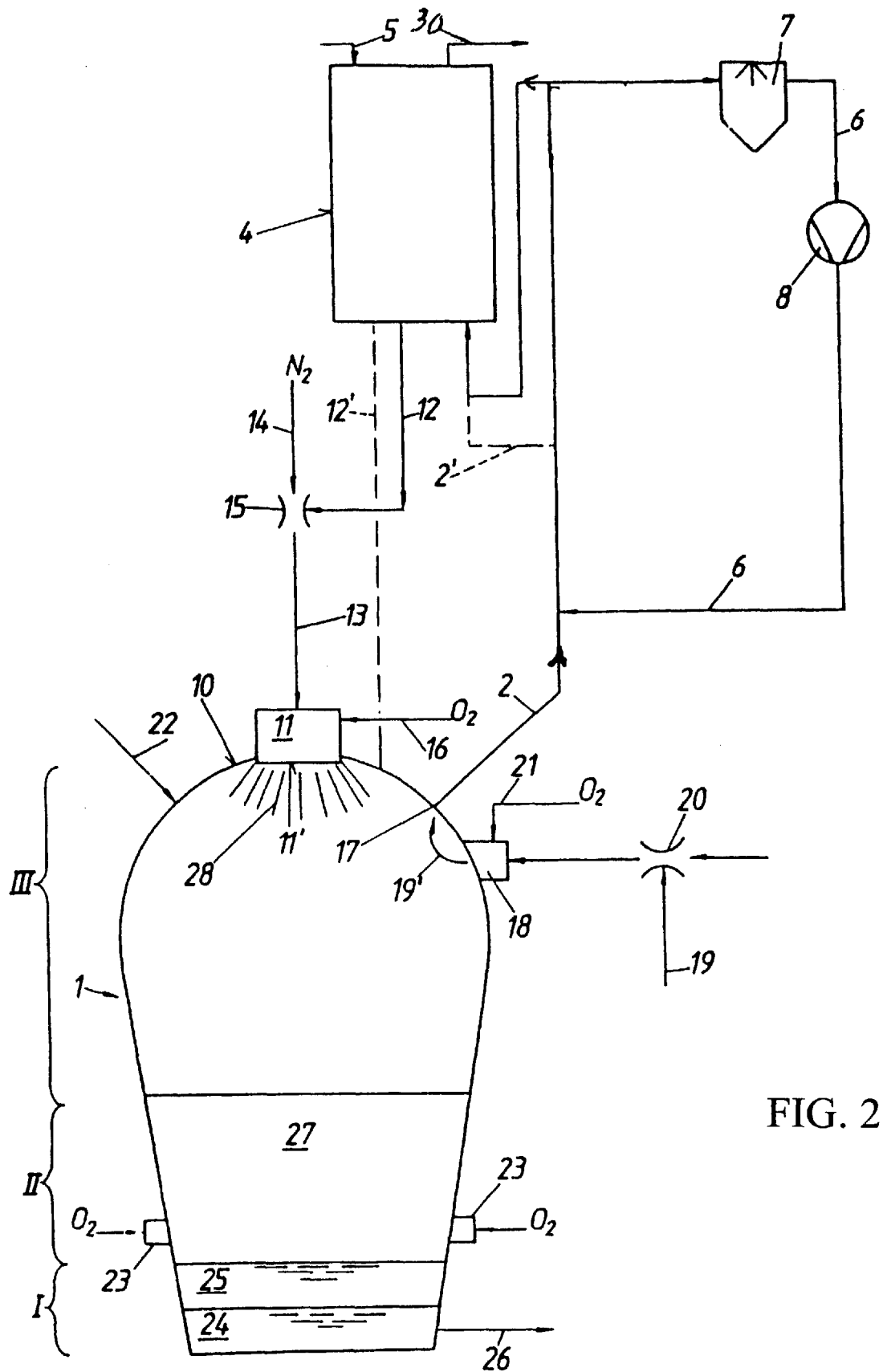

The dust recycling via cyclone 3 illustrated might be clearly reduced and optionally even omitted as shown in FIG. 2, since dust supplied to the reactor 4 via duct 2' indicated in broken lines (duct 2 between cyclone 3 and reactor 4 may be omitted in that case) is again discharged from the reactor 4 and supplied to the burner 11 along with the preheated and optionally prereduced solids and may be thermally utilized in the high-temperature zone 28. In that case, the cyclone 3 may, thus, be omitted or devised only with a view to the recirculating amount of reducing gas.

Preferably, the reactor 4 might be equipped with a fractionating means, the coarse-grain fraction (particles of between 0.5 and 8 mm) being supplied to the melter gasifier 1 directly, e.g., by means of gravity charging through duct 12', and the fine particles being supplied to the high-temperature combustion and/or gasification zone 28 through duct 12.

This causes the burner 11 to be relieved such that its heat is available exclusively for the finest particles, which have to be agglomerated in any event in order to avoid discharging of the same. The grain sizes of the particles of the coarse-grain fraction should be so such that the descending speed of those particles is slightly higher than the superficial velocity in the zone III of the melter gasifier 1. Thereby, discharging of those particles is prevented.

EXAMPLE 1,020 kg coal/ton PI (pig iron), thence 340 kg fine coal/ton PI 19 and the balance in the form of lumpy coal (at 22) as well as 1,460 kg fine-particulate iron-containing material 5/ton PI are charged to produce 40 tons of pig iron/hour by means of a plant according to the drawing.

Coal:
Chemical analysis of coal (fine coal 19 and lumpy coal, weight portions, dry basis)

| | |
|---|---|
| C | 77.2% |
| H | 4.6% |
| N | 1.8% |
| O | 6.8% |
| S | 0.5% |
| ashes | 9.0% |
| C-fix | 63.0% |

Grain size distribution of fine coal 19

| | |
|---|---|
| −500 μm | 100% |
| −250 μm | 85% |
| −100 μm | 51% |
| −63 μm | 66% |
| −25 μm | 21% |

Fine-particulate iron-containing material:
Chemical analysis (weight portions):

| | |
|---|---|
| $Fe_{tot}$ | 66.3% |
| $Fe_O$ | 0.4% |
| $Fe_2O_3$ | 94.5% |
| Loss on ignition | 1.0% |
| Moisture | 1.0% |

Grain size distribution

| | |
|---|---|
| −4000 μm | 100% |
| −1000 μm | 97% |
| −500 μm | 89% |
| −250 μm | 66% |
| −125 μm | 25% |

Fluxes:
Chemical analysis (weight portions):

| | |
|---|---|
| CaO | 34.2% |
| MgO | 9.9% |
| $SiO_2$ | 14.1% |
| $Al_2O_3$ | 0.3% |
| $Fe_2O_3$ | 1.1% |
| MnO | 0.5% |
| Loss on ignition | 39.1% |

321 $Nm^3$ $O_2$/ton PI are introduced into bed 27 through supply ducts 23 designed as tuyeres to gasify the coal, the consumption of the burner 11 being 255 $Nm^3O_2$/ton PI and of the burner 18 being 75 $Nm^3O_2$/ton PI.

Pig iron 24:
Chemical analysis (weight portions):

| | |
|---|---|
| C | 4.3% |
| Si | 0.4% |
| Mn | 0.09% |
| P | 0.1% |
| S | 0.05% |
| Fe | 95.0% |

Export gas:
Amount: 1,720 $Nm^3$/ton PI
Analysis (volume portions):

| | |
|---|---|
| CO | 38.7% |
| $CO_2$ | 37.2% |
| $H_2$ | 16.4% |
| $H_2O$ | 2% |
| $N_2$ + Ar | 4.6% |
| $CH_4$ | 1.1% |

Heating value: 7,060 kj/$Nm^3$

What is claimed is:

1. A process for producing pig iron or steel products from fine-particulate iron-containing material in a meltdown gasifying zone of a meltdown-gasifier, comprising
    introducing carbon containing material into said zone via a burner provided at the top of the meltdown-gasifier, and
    introducing fine-particulate iron-containing material into said zone, and
    introducing an oxygen-containing gas into said zone, and thereby producing molten pig iron and/or steel prematerial, slag, fine particulate coke, and a reducing gas in a reaction bed formed in said zone, and
    withdrawing said reducing gas and said fine-particulate coke from an outlet on the upper section of said meltdown gasifier, and
    introducing additional carbon-containing material in the form of fine particulate coal and/or other carbon-containing material having volatile portions near said outlet for withdrawing said reducing gas, and
    at least a portion of said oxygen-containing gas being introduced near said outlet for withdrawing said reducing gas, and
    separately drawing off said slag and said molten pig iron and/or steel prematerial in a lower section of said meltdown gasifier.

2. A process according to claim 1, characterized in that the fine-particulate coke is supplied to the melter gasifier along with the fine-particulate iron-containing material.

3. A process according to claim 2, characterized in that in a killing zone formed above the reaction bed a high-temperature combustion and/or gasification zone is formed by burning and/or gasifying under direct oxygen feeding the fine-particulate coke supplied to the melter gasifier, into which high-temperature combustion and/or gasification zone the fine-particulate iron-containing material is directly introduced, wherein at least surface melting of the iron-containing material and agglomerating of the same are effected by the heat released during the reaction of the fine-particulate coke.

4. A process according to claim 3, characterized in that the high-temperature combustion and/or gasification zone is formed centrally and on the upper end of the melter gasifier and the supply of the materials is effected in a downwardly oriented manner.

5. A process according to claim 3, characterized in that agglomeration is accelerated and intensified by swirling the iron-containing material in the high-temperature combustion and/or gasification zone.

6. A process according to claim 5, characterized in that oxygen feeding into the high-temperature combustion and/or gasification zone likewise is effected under swirling.

7. A process according to claim 3, characterized in that the iron-containing material is introduced into the high-temperature combustion and/or gasification zone in a state mixed with the fine-particulate coke.

8. A process according to claim 3, characterized in that the speed of entry of the iron-containing material and of the fine-particulate coke into the high-temperature combustion and/or gasification zone is increased by aid of a propellant.

9. A process according to claim 3, characterized in that reducing gas formed in the meltdown gasifying zone is fed to a preheating zone and/or a direct-reduction zone for pretreating the iron-containing material, the preheated and/or prereduced iron-containing material being supplied to the high-temperature combustion and/or gasification zone in the hot state.

10. A process according to claim 9, characterized in that fine-particulate coke is additionally supplied to the preheating and direct reduction zone.

11. A process according to claim 1, characterized in that lumpy coal is additionally introduced into the meltdown gasifying zone.

12. A process according to claim 9, characterized in that the iron-containing material in the preheating and/or direct reduction zone is separated into a fine-grain fraction and a coarse-grain fraction, the latter preferably comprising particles of between 0.5 and 8 mm, and only the fine-grain fraction is introduced into the high-temperature combustion and/or gasification zone and the coarse-grain fraction is introduced directly into the melter gasifier.

13. A process according to claim 9, characterized in that the reducing gas is fed to the preheating zone and/or direct reduction zone in a non-purified state.

14. A plant for carrying out the process according to claim 1, comprising a melter gasifier including supply and discharge ducts for the addition of carbon-containing material, iron-containing material, for drawing off the reducing gas produced and for feeding oxygen-containing gas and a slag and melt tap, a lower section of the melter gasifier being provided for collecting the molten pig iron and/or steel prematerial and the liquid slag, a central section located above the lower section being provided for accommodating a bed of solid carbon carriers, and an upper section being provided as a killing space.

15. A plant according to claim 14, characterized in that a return duct for fine-particulate coke (19') runs from the separating means (3) into the melter gasifier (1).

16. A plant according to claim 15, characterized in that at least one burner (11) supplying an oxygen-containing gas and fine-particulate iron-containing material (5) and a supply means for supplying the fine-particulate coke (19') are provided on the upper end of the killing space (III).

17. A plant according to claim 16, characterized in that a single burner (11) arranged on the vertical longitudinal central axis of the melter gasifier (1) is provided, whose burner mouth (11') is oriented towards the surface of the bed (27).

18. A plant according to claim 16, characterized in that the burner also serves for supplying fine-particulate coke.

19. A plant according to claim 16, characterized in that the burner is provided with a swirling means for the solids supplied via the burner.

20. A plant according to claim 16, characterized in that the burner (11) is provided with a swirling means for the oxygen-containing gas fed via the burner (11).

21. A plant according to claim 16, characterized in that a mixed-material duct (13) for supplying the fine-particulate iron-containing material (5) and the fine-particulate coke (19') opens into the burner.

22. A plant according to claim 14, characterized in that a reducing-gas discharge duct (2) runs into a means (4) for preheating and/or directly reducing the fine-particulate iron-containing material (5), departing from the killing space (III) of the melter gasifier (1).

23. A plant according to claim 22, characterized in that the means (4) for preheating and/or direct reduction comprises a fractionating means for separating the iron-containing material into a coarse-grain fraction and a fine-grain fraction and the fine-grain fraction is conducted to the burner (11) via a duct (12), whereas the coarse-grain fraction is directly supplied to the melter gasifier (1) via a duct (12').

24. A plant according to claim 22, characterized in that the reducing-gas discharge duct (2) runs directly into the means (4) for preheating and/or direct reduction, i.e., without intermediate arrangement of a dust separating means (3).

25. A merchantable product made of pig iron or steel preproducts produced by a process according to claim 1.

26. A process according to claim 1, wherein the withdrawn fine particulate coke is separated from the withdrawn reducing gas.

27. A process according to claim 1, wherein said fine-particulate iron-containing material is sponge iron.

28. A process according to claim 1, wherein said iron-containing material is completely reduced in said reaction bed.

29. A process according to claim 8, wherein said propellant is nitrogen or an in-process gas.

30. A merchantable product according to claim 25, said product being rolled stock.

31. A process according to claim 2, wherein said fine-particulate iron-containing material is preheated and/or reduced by aid of the reducing gas.

32. A process according to claim 12, wherein the coarse-grain fraction is introduced into the killing space of the melter gasifier.

* * * * *

UNITED STATES PATENT AND TRADEMARK OFFICE
CERTIFICATE OF CORRECTION

PATENT NO. : 6,264,722 B1
DATED : July 24, 2001
INVENTOR(S) : Werner Leopold Kepplinger et al.

Page 1 of 1

It is certified that error appears in the above-identified patent and that said Letters Patent is hereby corrected as shown below:

<u>Title page,</u>
Item [73], please amend the Assignee information to reflect three assignees:

-- Voest-Alpine Industrieanlagenbau GmbH, Linz (AT), Pohang Iron & Steel Co., Ltd. (KR); and Research Institute of Industrial Science & Technology, Incorporated Foundation (KR) --.

Signed and Sealed this

Twenty-eighth Day of May, 2002

Attest:

JAMES E. ROGAN
*Director of the United States Patent and Trademark Office*

*Attesting Officer*